United States Patent [19]

Fisun et al.

[11] Patent Number: 5,401,960
[45] Date of Patent: Mar. 28, 1995

[54] PROCESS FOR MARKING AN ARTICLE

[75] Inventors: Oleg I. Fisun; Lev N. Lupichev; Viktor V. Maklakov, all of Moscow, Russian Federation; Richard Schimko, Berlin, Germany

[73] Assignee: BORUS Spezialverfahren und -gerate im Sondermaschinenbau GmbH, Berlin, Germany

[21] Appl. No.: 161,134

[22] Filed: Dec. 3, 1993

[30] Foreign Application Priority Data

Dec. 4, 1992 [DE] Germany .................. 42 41 663.9

[51] Int. Cl.⁶ .............................................. G06K 7/12
[52] U.S. Cl. .................................. 250/271; 235/468; 283/89
[58] Field of Search .................... 250/271; 235/468; 283/89

[56] References Cited

U.S. PATENT DOCUMENTS

| | | | |
|---|---|---|---|
| 3,486,006 | 12/1969 | Siegel | 235/61.11 |
| 3,500,047 | 3/1970 | Berry | 250/271 |
| 3,760,161 | 9/1973 | Lohne et al. | 235/61.11 E |
| 3,852,088 | 12/1974 | Godlewski et al. | 117/1 |
| 4,605,846 | 8/1986 | Duret et al. | 235/468 |
| 5,206,496 | 4/1993 | Clement et al. | 250/271 |

FOREIGN PATENT DOCUMENTS

| | | |
|---|---|---|
| 157546 | 10/1985 | European Pat. Off. . |
| 411602 | 2/1991 | European Pat. Off. . |
| 467067A3 | 1/1992 | European Pat. Off. . |
| 2560119 | 2/1984 | France . |
| 3839772A1 | 5/1990 | Germany . |
| 4126626A1 | 2/1992 | Germany . |

OTHER PUBLICATIONS

European patent search for parent European patent application EP 93250332, Apr. 21, 1994.

Primary Examiner—Jack I. Berman
Attorney, Agent, or Firm—Chilton, Alix & Van Kirk

[57] ABSTRACT

Process for marking an article by means of a pattern, which contains geometrically encoded information and can be evaluated with optical means by irradiation with light, there being provided on the surface of the article in a spatial arrangement in relation to an information pattern which can be evaluated by means of irradiation with UV light but is not visible to a human viewer a further information pattern which can be evaluated by means of visible light, the evaluation of the information contained in the two markings being able to be performed exclusively by means of the information pattern which can be evaluated by irradiation with UV light.

17 Claims, 7 Drawing Sheets

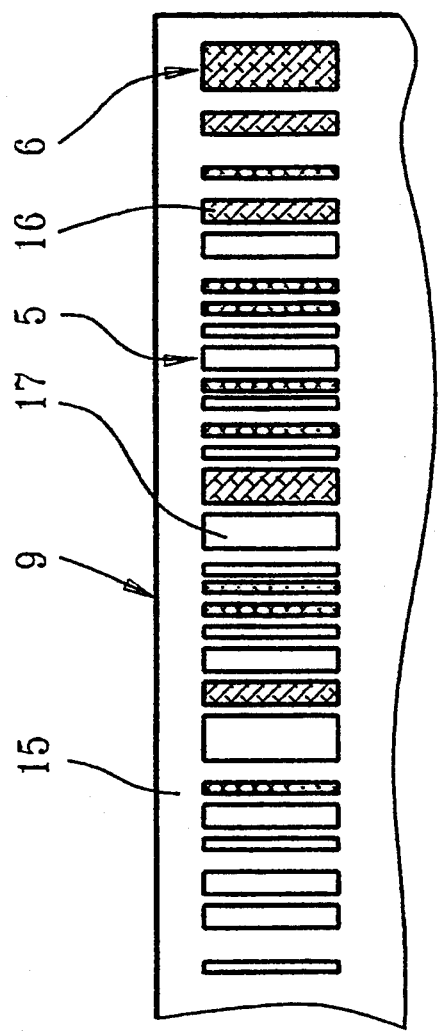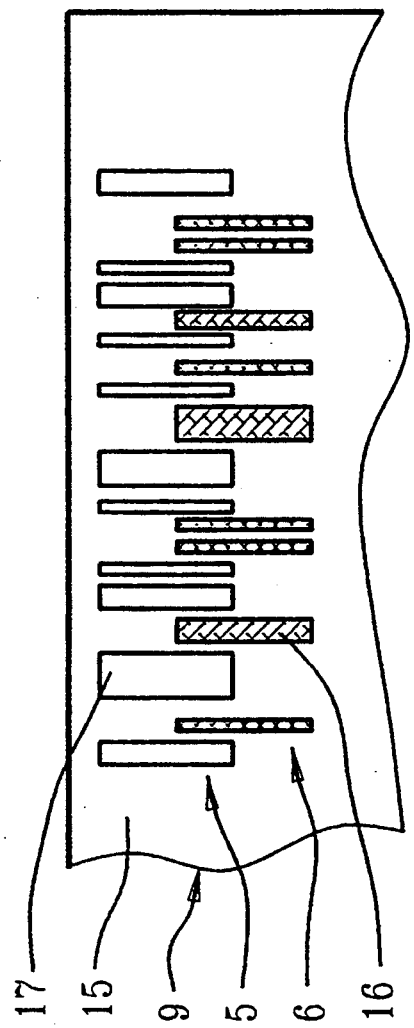

PROCESS FOR MARKING AN ARTICLE

DESCRIPTION

1. Field of the Invention

The invention relates to a process and apparatus for marking an article by means of a pattern, which contains geometrically encoded information and can be evaluated with optical means by irradiation with light, and for reading the information.

2. Background of the Invention

It is known to provide articles with optically readable information, whether serving for identification or containing additional information which is of use in conjunction with the article concerned.

The information patterns are positioned at a suitable point on the article to be provided with the information by printing and/or adhesively attaching them.

French Patent Specification 2,560,119 discloses in particular a process which operates by means of a so-called stream laser head. In this case, the article to be marked passes by means of a conveyor belt in front of the stream laser print head. By means of a microprocessor-controlled apparatus, the laser head is positioned and guided for the sequential generation of a predetermined writing pattern. This involves, for example, defining the position of a number of predetermined letters and numbers by their coordinates. Three photoelements in this case check the position of the article to be marked on the conveyor line. When the said article has reached a defined position, the stream laser print head switches on and applies the marking characters dot by dot to the surface material. A grid matrix in this case comprises, for example, thirty horizontal dots and thirty vertical dots. A downstream reader subsequently checks the quality of the marking characters applied.

A further process serves for the protection of bank notes and securities against forgeries and is known from French Patent Specification 2,560,119. This process is based on the fact that a fluorescent substance of a predetermined concentration is applied to the material surface. This may involve both individual regions and the entire surface of the note or security. In the subsequent illumination of a material treated in such a way by radiation of a predetermined wavelength, a lighting up of the fluorescent substance in a characteristic range within the visible or ultraviolet part of the spectrum is produced.

Another process for the encoded protection and individualizing identification of documents which prevents any duplication on copiers is based on the use of special dyestuffs of high reflectivity in a predetermined part of the spectrum and is known from U.S. Pat. No. 3,852,088. The chosen spectral range is in this case characteristic of a particular type of electrostatic copiers, so that this colourant is not evident in the case of normal viewing, but after copying by means of a copier stands out clearly on the copy. In this case, however, the dyestuff partly absorbs radiation of other wavelengths which are characteristic of copiers of a different type, so that here the protective effect is reduced. On the other hand, the colourant of the document paper may be chosen such that it is masked by a special marking ink. All these measures have the result that, when the document is copied, under certain conditions the marking characters are not reproduced.

DE 38 39 772 A1 discloses a bar-code reading system and a corresponding bar-code system in which at least two bar codes arranged one above the other and/or crossing each other are used. In the case of this system, which serves for increasing the information density on a limited marking surface area, marking and reading devices operating at different wavelengths can also be employed.

It is known from DE 41 26 626 A1 to provide material objects (in particular glass bottles) with markings under their surface in the form of a region of increased impermeability to electromagnetic radiations. In this case, a high-energy beam is directed at the article and focused on a point lying below the surface of the latter, so that a localized ionization of the material is effected there. If the material is impermeable in the visible range to electromagnetic radiation, such a marking is concealed to the naked eye, but can be perceived with technical aids.

All the processes mentioned above share the problem that such patterns are not made sufficiently forgery-proof, i.e. that these patterns can be imitated or changed, it generally being adequate to take over an existing pattern from another (genuine or authentically marked) article. In such cases, the printing technology also usually presents no difficulties, since equipment operating by customary printing techniques is usually freely available.

SUMMARY OF THE INVENTION

The invention is based on the object of specifying a process of the generic type mentioned at the beginning which creates the possibility of applying a concealed marking without any special chemical or mechanical pretreatment to virtually any desired nonmetallic articles in a nondestructive and substantially forgery-proof manner and of reading such a marking again, and of specifying an apparatus for carrying out the said process.

This object is achieved by a process for marking an article by means of a pattern, which contains geometrically encoded information and can be evaluated with optical means by irradiation with light, and for reading the information, characterized in that a first information pattern, which can be evaluated by means of the irradiation with UV light but is not visible under visible light, and a second information pattern, which can be evaluated by means of visible light, are applied on a surface of the article in a spatial arrangement in relation to each other and the information contained in the two patterns is encoded in such a way that its evaluation can be performed exclusively by means of the first pattern, and in that the signals obtained upon reading out the first pattern are subjected to a decoding logical operation together with the signals obtained upon reading out the second pattern.

The invention embraces a recognition of the idea that, by dividing the identifying marking of an article into two information patterns with different detectability, the information essential for the identification of the article being contained in a non-visible information pattern, a considerable increase in forgeryproofness can be achieved, since unauthorized persons are unaware of their existence and informational content and no effective falsification is possible by manipulation of the visible marking alone.

In the case of an advantageous further development of the invention, it is favourable that, just by physically changing the optical characteristics of the material to be treated in the non-visible range of the optical spectrum in various materials without changing their physico-chemical structure, it is possible to produce patterns exhibiting information which cannot be destroyed by the influence of external factors and are not visible to the human eye without technical aids. The process uses conventional means here to produce uncopyable markings on articles by means of coherent, high-intensity radiation in the form of pulses, which also cannot be manipulated by customary means.

In the case of an advantageous further development of the process according to the invention, it is favourable in particular that neither the material surface of the article to be treated nor its structure are damaged. This involves the advantage on the one hand that the first information pattern, not visible under visible light, can be placed at any desired location in the vicinity of the second information pattern, visible under this light. The visible information pattern deceives the person with intentions of forgery as to the existence of a further marking and consequently additionally safeguards the marking existing in the invisible information pattern.

In particular, the marking of the article with an invisible pattern is produced by means of high-energy pulsed radiation, the irradiation taking place at a wavelength in the range from 250 to 450 nm. By variation of the charging voltage, the pulse repetition rate, the local dwell time or writing speed and/or the spot diameter of the laser beam, the radiation energy of the latter is set in such a way that the local amount of radiation exceeds a threshold value necessary for achieving a permanent marking, the integral of the energy converted into heat being set at the same time in such a way that, taking heat dissipation into account, the local heating remains below the temperature at which any significant permanent deformation or other change of the material of the article to be treated occurs.

The marking produced in this way, which comprises a pattern invisible under visible light, is then made visible or read out in an advantageous way by means of an illumination system with the light wavelength close to the resonance absorption wavelength of the marked material.

Other advantageous further developments of the invention are characterized in the subclaims and or represented in more detail below together with the description of the preferred configuration of the invention with reference to the figures.

BRIEF DESCRIPTION OF THE DRAWINGS

FIGS. 3 to 7 show advantageous further developments of the representation shown in FIG. 2.

DESCRIPTION OF THE PREFERRED EMBODIMENTS

Figure 1:
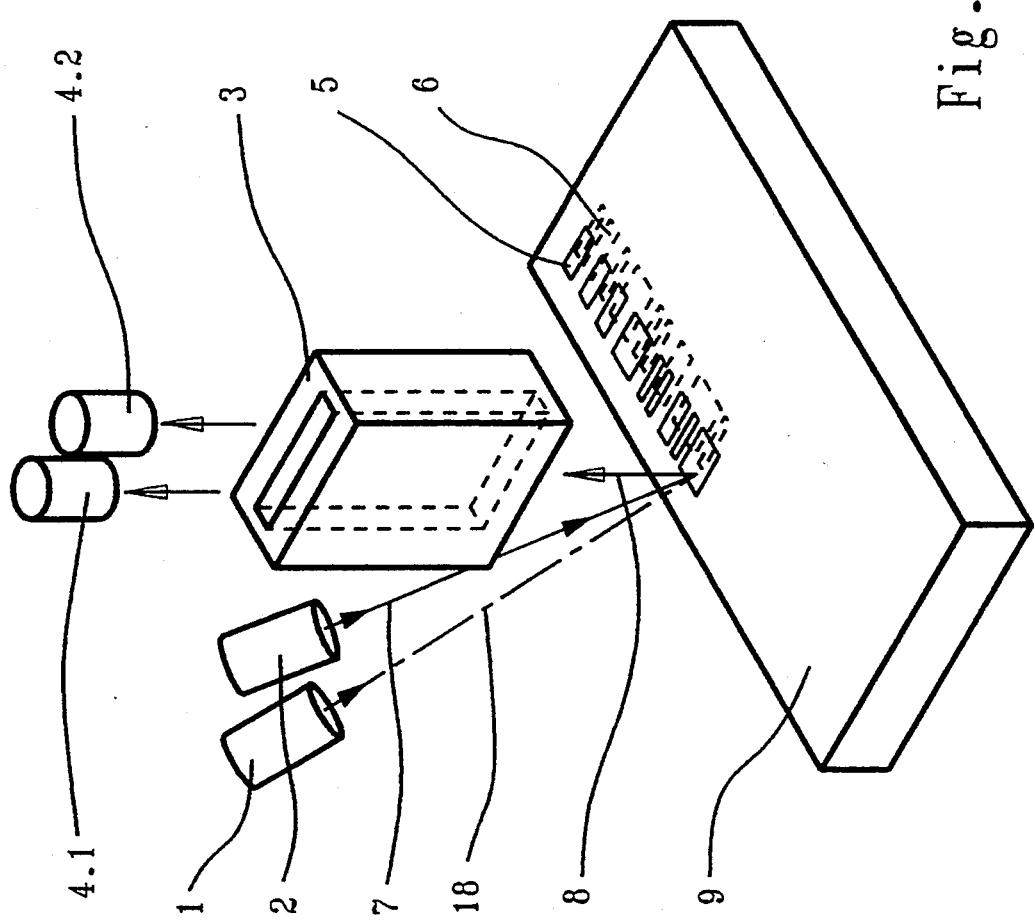
FIG. 1 shows a preferred embodiment of the apparatus used according to the process for the marking and identification of an article in schematic representation.

The apparatus represented in FIG. 1 in a perspective view for the marking and recognition of an article 9 marked according to the process substantially comprises a radiation source 1 for producing a first non-visible information pattern 6 by irradiating the surface of the article 9 to be marked in the marking region with high-energy laser light of a wavelength close to the resonance wavelength (maximum spectral absorption), an illuminating device 2, covering also the ultraviolet light range, for making visible the first information pattern 6, invisible under visible light, an optical system 3 for conditioning the light 8 reflected from the information patterns 5, 6 under illumination with a light beam 7 of a certain wavelength, two radiation detectors 4.1, 4.2 with different resonant frequencies and electronic means (represented in FIGS. 8 to 10) for evaluating the optical signals recorded by the detectors 4.1, 4.2.

The applying of the second information pattern 5, visible under visible light in the wavelength range from 380 to 760 nm, is performed by adhesively attaching, printing on or by permanent mechanical deformation of the surface of the article 9 to be marked. The information pattern 6, invisible under visible light, is produced by irradiation of the article 9 to be marked with light of a wavelength close to the maximum spectral absorption of the material of which the article 9 consists, and is placed in the vicinity of the visible information pattern 5.

The reading out of the information contained in the patterns 5, 6 is performed by a broad-band illuminating device 2 in one reading cycle. In contrast, an illuminating device 2 operating with two different wavelength ranges requires two reading cycles with a different wavelength in each case, matched to the respective information pattern 5, 6 ($\lambda_1 = 1/f_1$ and $\lambda_2 = 1/f_2$, respectively). The wavelength $\lambda_2$ in this case lies in the ultraviolet range of light. During reading out, the illuminating device 2 and the article marked according to the process are moved in relation to each other.

Figure 2:
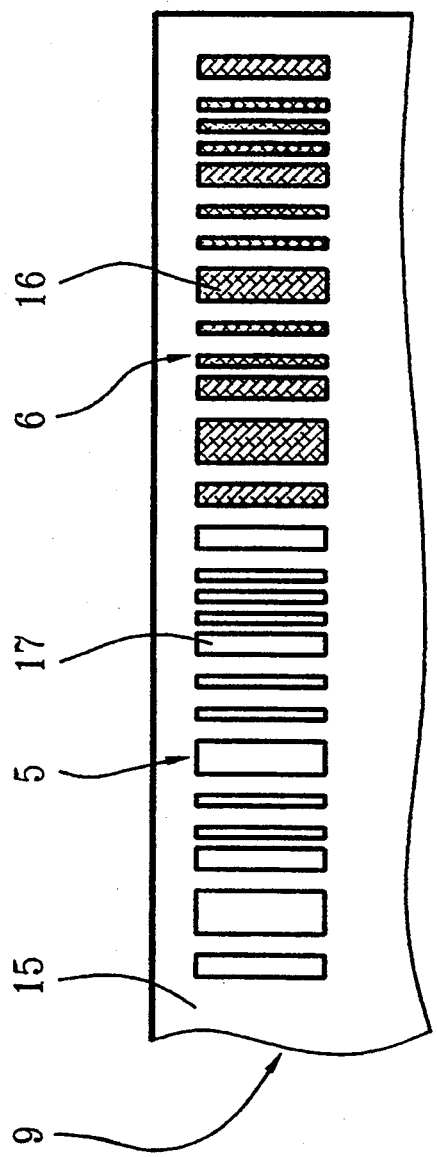
FIG. 2 shows the schematized representation of an advantageous arrangement of information patterns based on the process according to the invention.
Figure 3:
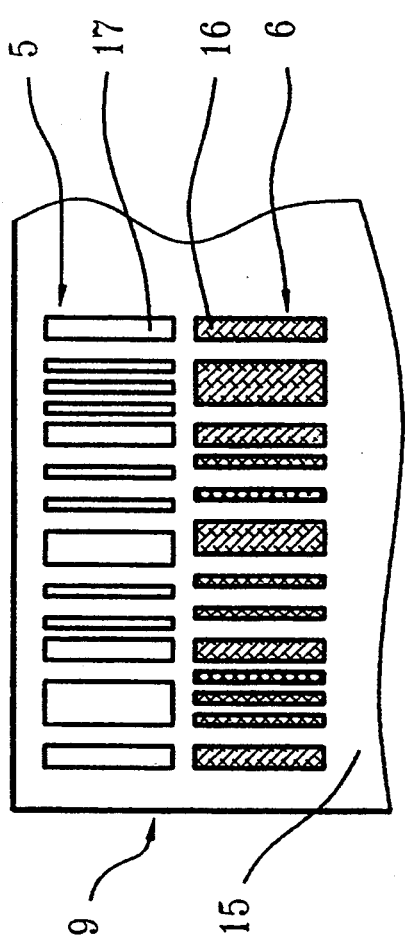
Figure 6:
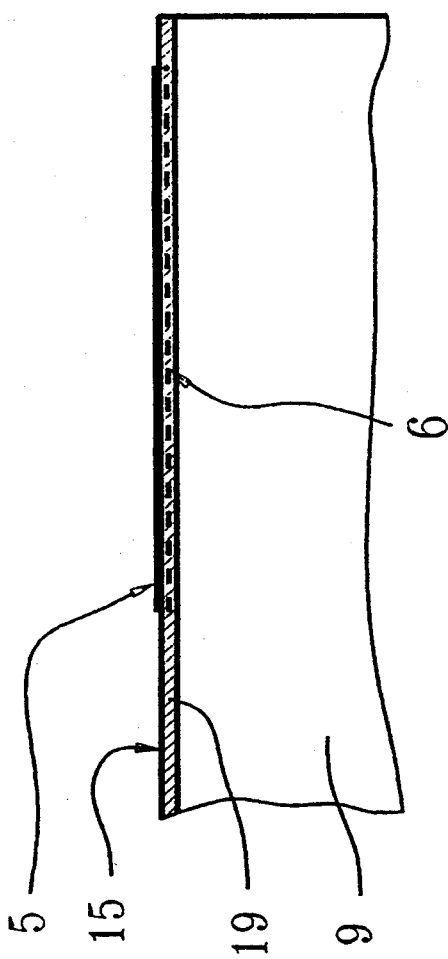
Figure 7:
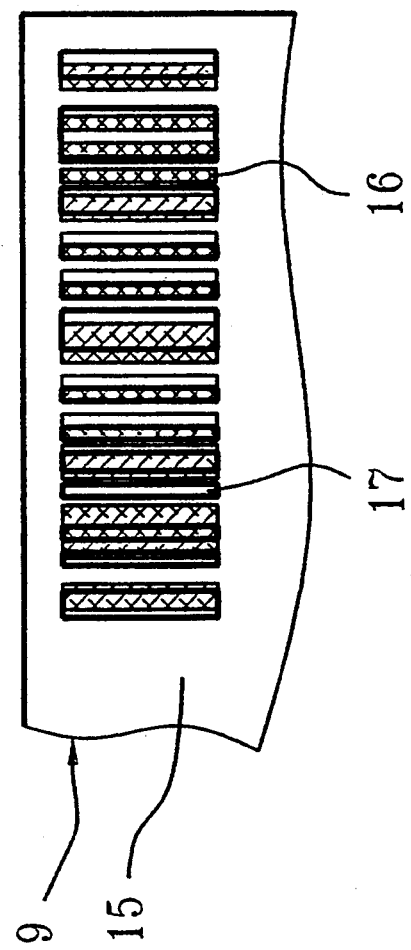

The possibilities of an advantageous arrangement of the two differently recognizable information patterns 5, 6 is represented in schematized form in FIGS. 2 to 7. In this case, it is favourable to arrange the two information patterns 5, 6 in one plane on the surface 15 of the article 9 to be marked. The information patterns 5, 6 are preferably designed as bar codes 16, 17 and are arranged either lying next to each other in series (FIG. 2) or lying parallel one above the other (FIG. 3). In this case, it is possible in a favourable way that the bar code elements 17 of the visible information pattern 5 completely coincide with the corresponding code elements 16 of the information pattern 6, which is only visible upon illumination with ultraviolet light (FIG. 2).

In order in an advantageous way to reduce the marking region in terms of surface area, the information patterns 5, 6 may also be arranged nested one in the other, the elements 16, 17 of the bar coding not overlapping. The nesting is appropriate in the longitudinal direction (FIG. 4) or transversely with respect to the longitudinal extent of the information patterns 5, 6 (FIG. 5).

In addition, a favourable reduction of the marking region is possible by arrangement of the information patterns 5, 6 in planes lying one above the other on the surface 15 and in the shell 19 of the object 9 to be marked. In order to ensure the legibility of the non-visible information pattern 6 in the case of a possible surface-area overlap of the code elements 16, 17, the elements 17 of the bar code of the visible information pattern 5 have an adequate transparency to the ultraviolet light required for making visible the information pattern 6. This form of arrangement of the information patterns 5, 6 is represented in schematized form in FIGS. 6 (sectional view) and 7 (plan view).

Figure 8:
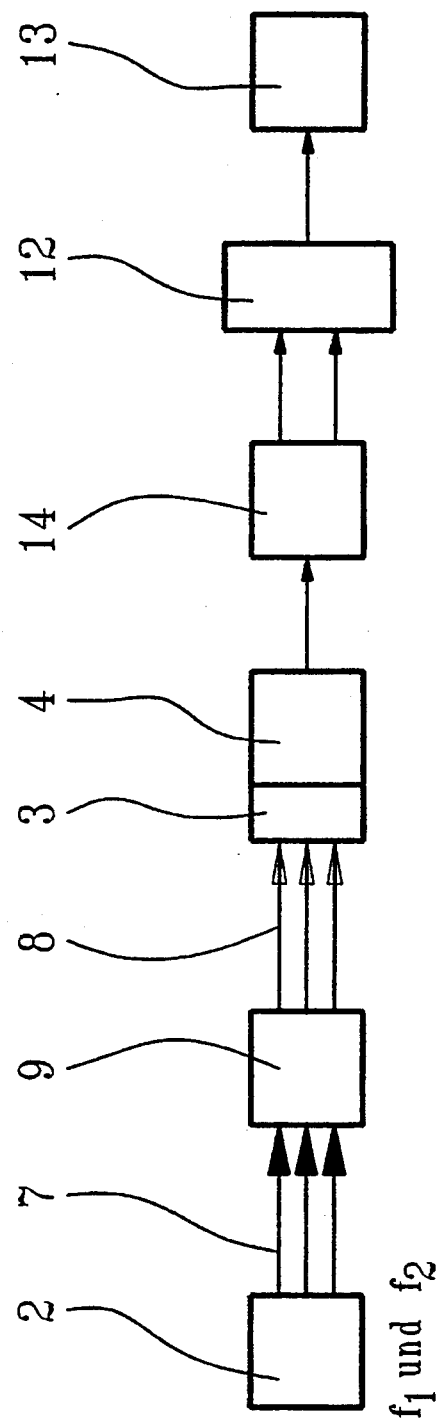
FIG. 8 shows an exemplary embodiment of an apparatus for carrying out the process according to the invention in a block diagram.
Figure 9:
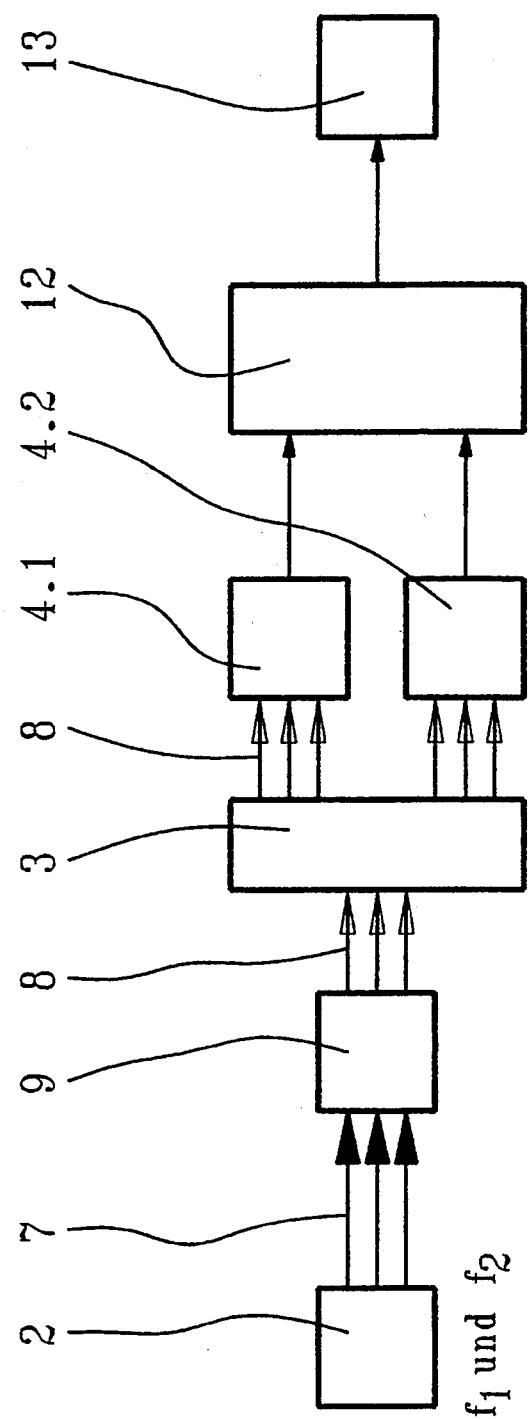
FIG. 9 shows an advantageous further development of the apparatus represented in FIG. 8
Figure 10:
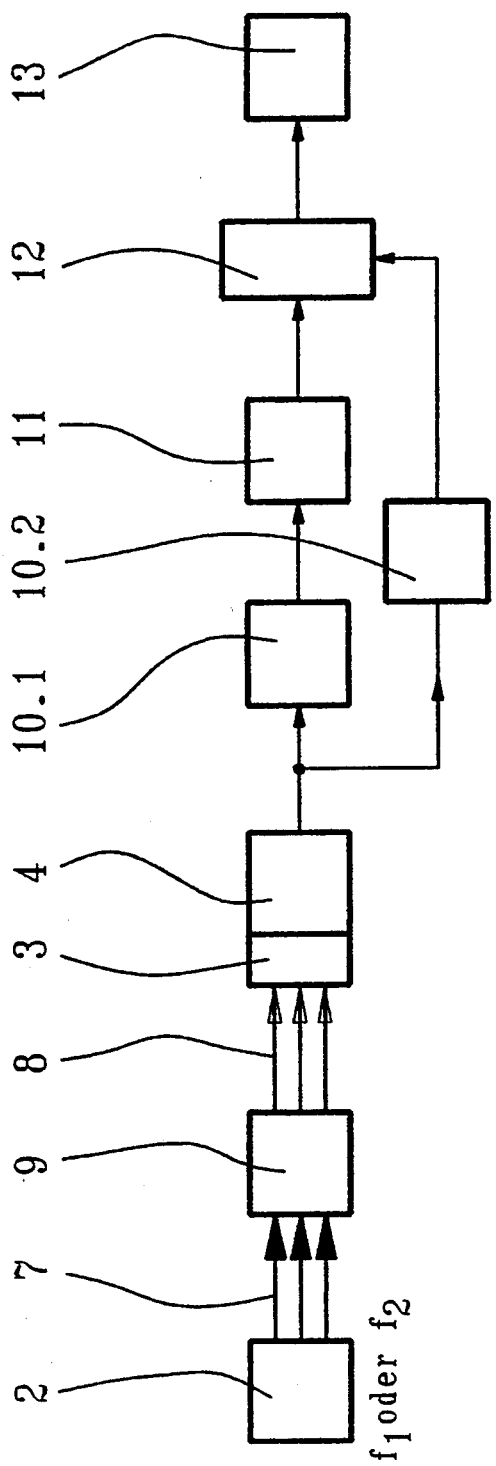
FIG. 10 shows another favourable further development of the apparatus represented in FIG. 8.

FIGS. 8 to 10 respectively show as a block diagram the arrangement of the devices for reading out the information patterns provided on the marked article 9.

According to the representation in FIG. 8, the reading out of the information is performed in one reading cycle. The illuminating device 2 generates a light with a bandwidth which contains two wavelengths (or frequencies $f_1$ and $f_2$), matched to the individual information patterns. The light 7 emitted by the illuminating device 2 falls onto the marking region of the marked object 9 and is reflected there. The reflected light 8 passes an optical beam-preparing device 3 and is then converted by a broad-band radiation detector 4 into electric signals. The double filter 14, arranged downstream of the radiation detector 4, separates the quantities of information, assigned in terms of frequency to the individual information patterns. The said quantities of information are logically combined with one another in this stage 12 and indicated in the evaluation unit 13.

The use of a double filter may be dispensed with when using a single reading cycle if, after leaving the beam-preparing device 3, the reflected light 8 is fed to two radiation detectors having resonance points of sensitivity which are matched appropriately to the wavelengths (or frequencies $f_1$ and $f_2$) of the individual information patterns (FIG. 9).

In FIG. 10 a circuit arrangement is represented by which a reading out of the information patterns is performed in two cycles. The illuminating device 2 is able to be switched over to two wavelength ranges ($\lambda_1 = 1/f_1$ and $\lambda_2 = 1/f_2$, respectively), matched to the first, visible pattern and the! second, non-visible pattern. The radiation detector 4 has a sensitivity adequate for both wavelengths. The electrically equivalent signals available at its output; are fed via the filters 10.1 and 10.2, the resonant frequencies of which coincide with $f_1$ and $f_2$, respectively, to the logic unit 12 and then displayed in the evaluation unit 13. Adapted to the time clock of the two reading cycles, an intermediate storage of the detected information signals of the first reading cycle is performed briefly (for the duration of the second reading cycle) in a memory 11, to be further processed in the logic unit 12 together with the signals detected in the second reading cycle.

The invention is not restricted in its configuration to the preferred exemplary embodiment specified above. Rather, a number of variants which make use of the solution described are conceivable, even in the case of configurations of a fundamentally different type.

What is claimed is:

1. A process for marking an article by means of a pattern, which contains geometrically encoded information and can be evaluated with optical means by irradiation with light, and for reading the information, characterized in that a first information pattern, which can be evaluated by means of the irradiation with UV light but is not visible under visible light, and a second information pattern, which can be evaluated by means of visible light, are applied on a surface of the article in a spatial arrangement in relation to each other and the information contained in the two patterns is encoded in such a way that its evaluation can be performed exclusively by means of the first pattern, and in that the signals obtained upon reading out the first pattern are subjected to a decoding logical operation together with the signals obtained upon reading out the second pattern.

2. Process according to claim 1, characterized in that the applying of the first pattern is performed by local irradiation of the article to be marked with coherent high-energy radiation at a wavelength close to the resonance wavelength of the material of the article to be marked and with such intensity that, on the one hand, a permanent marking is produced which, upon irradiation with light of a corresponding wavelength, has a changed optical effect in the UV range in comparison with the effect of the unirradiated neighbouring material and, on the other hand, there does not occur any significant permanent thermally induced changing of the material of the article to be marked.

3. Process according to claim 2, characterized in that the applying of the second pattern is performed by adhesively attaching, printing on or permanent mechanical deformation of the surface in the marking region of the article to be marked.

4. Process according to claim 1, characterized in that, for reading out the first pattern, an illumination is performed with light of a wavelength in the range of the resonance wavelength of the material of the marked article, preferably with ultraviolet light.

5. Process according to claim 1, characterized in that the second and/or the first pattern are designed as a bar code.

6. Process according to claim 1, characterized in that the irradiation for applying the first pattern is performed by a laser at a wavelength in the range from 250 to 450 nm.

7. Process according to claim 1, characterized in that the second pattern is arranged in the same plane to the side of the first pattern on the outer surface of the article to be marked.

8. Process according to claim 1, characterized in that both patterns have bar codes and are arranged at least partially nested one in the other in one plane on the surface of the article to be marked.

9. Process according to claim 1, characterized in that the second pattern and the first pattern are arranged lying one above the other in different planes on the surface and on a—in particularly transparent—shell of the article to be marked.

10. Process according to claim 9, characterized in that the second pattern and the pattern which can be read out by means of UV light at least partially overlap each other or are arranged geometrically nested one in the other.

11. Process according to claim 1, characterized in that the reading out of the two patterns is performed in one reading cycle using a broad-band illuminating device and at least one radiation detector.

12. Process according to claim 1, characterized in that the reading out of the two patterns on the marked article is performed in each case in one of two reading cycles following in direct succession using an illuminating device which can be switched over in its wavelength and using a broad-band radiation detector.

13. Apparatus for carrying out the process according to claim 1, characterized by:

a device for generating the second pattern, a device for the local irradiation of the article to be marked with laser light of a wavelength close to the resonance wavelength of the material and with such intensity that a permanent marking is produced, which upon irradiation with light of a corresponding wavelength shows a changed optical effect in comparison with the effect of the untreated neighbouring material, an illuminating device emitting visible light, an illuminating device which has a light wavelength close to the resonance absorption wavelength, by which the marking is made visible, an optical system for aligning the radiation reflected from the marking region of the marked article with a detection device, a detection device having at least one optical radiation detector and arranged downstream of the detection device, electronic means for filtering, storing, logically combining and evaluating the output signals of the detection device, originating from the patterns and recorded by the detection device.

14. Apparatus according to claim 13, characterized in that the illuminating device generates light with a broad band, for reading out both the visible information pattern and the information pattern which can be read out with UV light.

15. Apparatus according to claim 13, characterized in that the illuminating device is designed such that it can be switched over with respect to the wavelength range of the radiated light.

16. Process according to claim 1, characterized in that the first and the second pattern have at least one coinciding information component.

17. Process according to claim 9, characterized in that the upper pattern is designed such that it is transparent to light in the wavelength range for reading out the lower pattern.

* * * * *